May 24, 1955  G. TODD  2,709,010
CONTROL SYSTEM FOR ELECTROPLATING AND LIKE MACHINES
Filed June 22, 1950  7 Sheets-Sheet 1

INVENTOR
GUERIN TODD
BY
Toulmin & Toulmin
ATTORNEYS

May 24, 1955  G. TODD  2,709,010
CONTROL SYSTEM FOR ELECTROPLATING AND LIKE MACHINES
Filed June 22, 1950  7 Sheets-Sheet 7

*INVENTOR.*
GUERIN TODD
BY Pennie Edmonds Morton
Barrows Taylor
ATTORNEYS

United States Patent Office 2,709,010
Patented May 24, 1955

2,709,010

CONTROL SYSTEM FOR ELECTROPLATING AND LIKE MACHINES

Guerin Todd, Shrewsbury, N. J., assignor to Hanson-Van Winkle-Munning Company, Matawan, N. J., a corporation of New Jersey Application June 22, 1950, Serial No. 169,762

6 Claims. (Cl. 214—89)

This invention relates to control systems for controlling the operation of a machine having a plurality of work stations to and from which work members are conveyed in a desired cycle of operations. More particularly, the invention is concerned with a system for controlling the operation of a machine, which includes a plurality of means for conveying the work members and in which the work members are advanced by at least one of the conveying means through variable distances in different basic cycles. The system is applicable to a number of different kinds of machines and may be employed to effect different cycles of operation.

The particular machine illustrated and described in this application is an automatic processing machine of the type for conveying workpieces through a series of work operations including mechanical, chemical, and electrolytic treatments. It will be understood, however, that the control system to be described is also adapted for use in connection with other types of apparatus, as, for example, certain machine tools, and conveying and handling apparatus. Each of the types of apparatus referred to, as well as many other types of machines and devices include a plurality of movable devices which are to be moved in certain directions and at certain times for carrying out work operations on workpieces which may either be carried by the members, or operated on by the members.

In connection with processing machinery and the like, it has always been difficult to provide sufficient flexibility of operation to make the machine generally useful. In the main, automatic processing machines have been so constructed that a plurality of workpiece supporting elements are moved about a closed path in the machine to convey the workpieces through a plurality of work stations which may be arranged in a line along one side of the path of movement of the elements, or in a circuitous path to provide treatment stations along substantially the entire path of movement of the elements.

Many workpieces, especially large and bulky workpieces, and particularly workpieces which are curved, are difficult to treat in an apparatus of this type. For example, automobile bumpers are generally quite curved from end to end and in order to plate them properly the anodes that supply the metal to be plated out must be arranged in a pattern substantially conforming to the configuration of the bumper. Because of this it is impossible to move the bumpers along a plating tank as would be done by the usual type of processing apparatus. Rather, it is necessary to lower the bumpers vertically into a prepared plating station and then to raise them vertically therefrom when the plating is completed.

Inasmuch as the plating time on any workpiece is several times as great as the time required for carrying out the various pre-plating and post-plating rinsing and cleaning operations, it will be evident that it would be advantageous to have a plating tank several work stations in length so that the processing apparatus could deposit workpieces in the plating work stations and then proceed with operations on other workpieces. In order to accomplish this, it is necessary to disengage the workpiece from the processing machine conveyor and provide skip-stop movement of the workpiece.

A processing machine of the type referred to requires a special control system to effect selection of the workpieces that are to be deposited in the various plating work stations, and of the workpieces that are to be removed from the various plating work stations. Similarly, the amount of movement of the conveyor of the processing machine is variable, and special control means are required to effect the proper control of the machine conveyor.

Having the foregoing in mind, the particular object of this invention is the provision of a control system for a machine of the type referred to by means of which the movement of the various movable elements of the machine can be selectively controlled.

A still further object is the provision of a control system for an apparatus having multiple work members which will effect selective control of the movements of the said members during an operative cycle of the machine.

It is also an object of this invention to provide a relatively simple control system adapted for automatically controlling a plurality of work members of a machine so the work members operate according to fixed and interlocked cycles during a cycle of operation of the machine.

Another object of this invention is to provide a control system for effecting the selective latching and unlatching of work supporting elements, in a machine of the type referred to, to the conveyor of the said machine.

These and other objects and advantages will become more apparent upon reference to the following description taken in connection with the accompanying drawings in which.

*General description and arrangement of the machine*

The mode of operation of the processing machine according to this invention will best be seen on reference to Figures 11 through 22, wherein it will be noted that the machine consists of a plurality of preparation tanks, a plating tank comprising a plurality of individual stations, a plurality of finishing tanks, and a loading and unloading station.

The work members, which are represented as barrels in these figures, are adapted for detachable connection with a conveyor that will move the work members in elevated position from station to station, while an elevator is provided for moving the work members vertically between the conveyor and working position in the several stations.

Figures 11, 13:
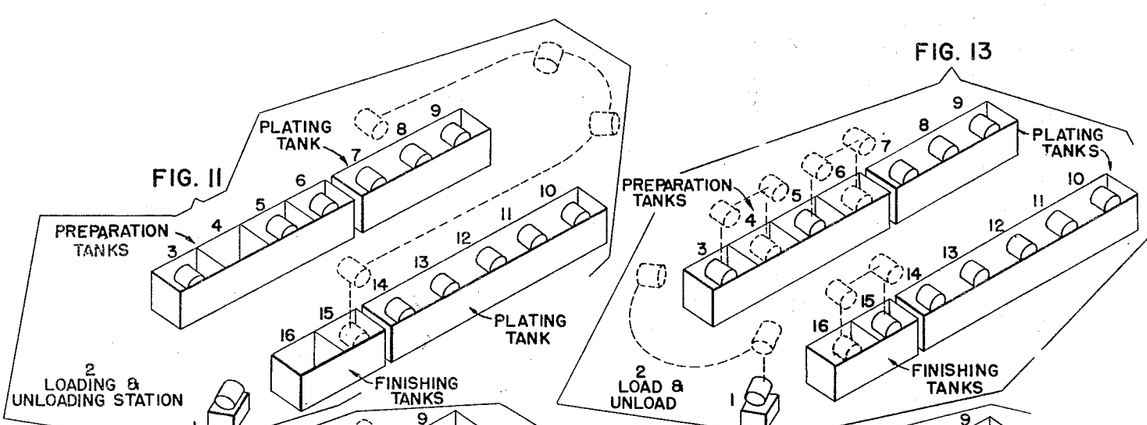
Figures 11 through 14 are diagrammatic perspective representations of the four basic steps that take place in carrying out a basic operative cycle of the machine according to the first modification thereof.

In Fig. 11, the machine is shown in a condition in which there is a work member in the loading and unloading station, a work member in each of the preparation tanks, except the second one, a work member in each station of the plating tank, and no work members in the finishing tanks. The first step in the cycle is indicated in dashed lines in Figure 11, and consists of removing one of the work members from the plating tank, in this case the one from the first station thereof, and conveying this work member to and setting it down in the first finishing tank.

Figures 12, 14:
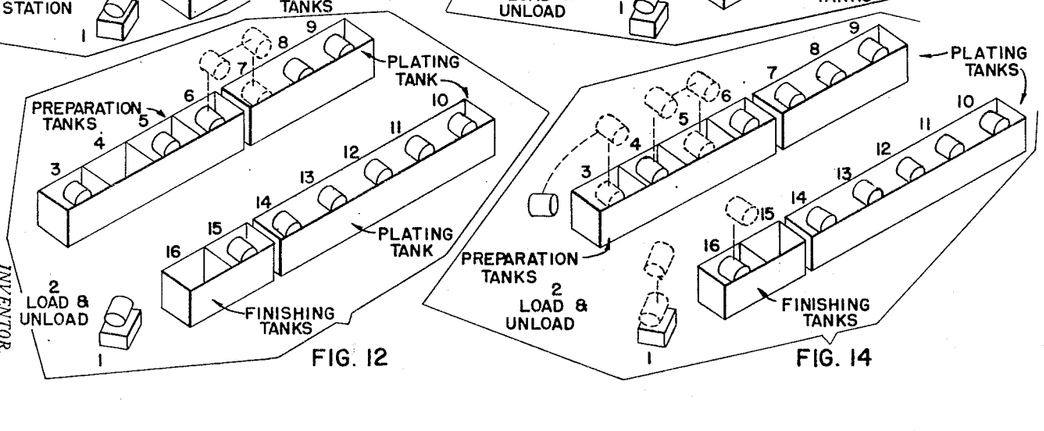

The second step of the cycle is illustrated in Figure 12, in the dashed lines therein, and consists of moving the work member from the last one of the preparation tanks and conveying it to and setting it down in the station of the plating tank that was vacated in the step of Figure 11.

The third step of the cycle is indicated in dashed lines in Figure 13, and consists of lifting the work members that are in the preparation tanks, the one in the finishing tank, and the one at the loading and unloading station, and conveying these work members one step and then setting down all of the work members except the one that was taken from the loading and unloading station.

The final step in the cycle which will return the machine to the condition shown in Figure 11 is illustrated in dashed lines in Figure 14, and this consists of lifting the work member from the second one of the preparation tanks and from the last one of the finishing tanks and conveying them, together with the work member that was previously attached to the conveyor, from the loading and unloading station one step, and then setting all of the work members down. The machine is now again precisely as it was before the Figure 11 step, and this basic cycle will then be repeated, but with another work member being removed from the plating tank on the next cycle, and with this other vacated station then being filled with the work member from the last of the preparation tanks.

That work member, accordingly, passes through the preparation tanks in succession, is then delivered to one of the plating tanks, dwells therein for a period during which other work members are delivered to the plating tank, and is then removed from the plating tank and conveyed through the finishing tanks in succession and delivered to the loading and unloading station.

Figure 15:
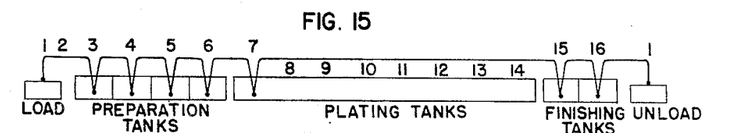
Figures 15 through 22 are diagrammatic views illustrating the several different basic cycles which taken together make up one complete overall cycle of the machine.
Figure 16:
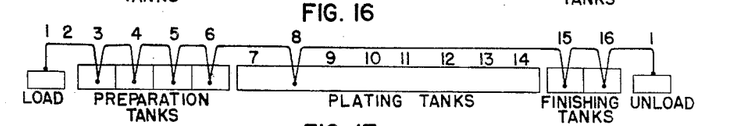
Figure 17:
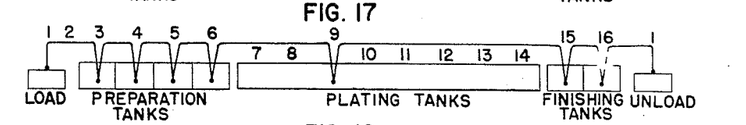
Figure 18:
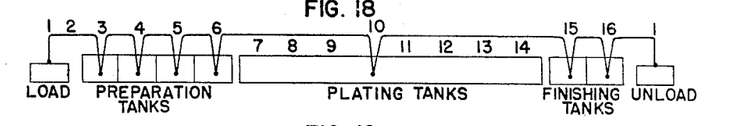
Figure 19:
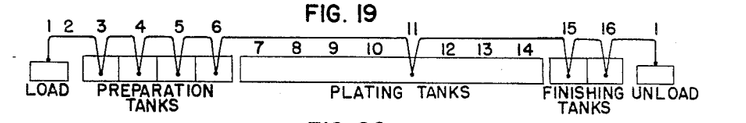
Figure 20:
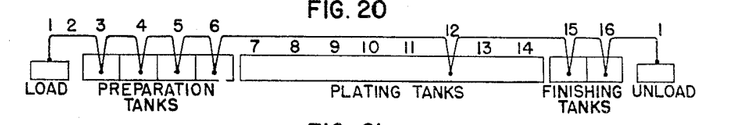
Figure 21:
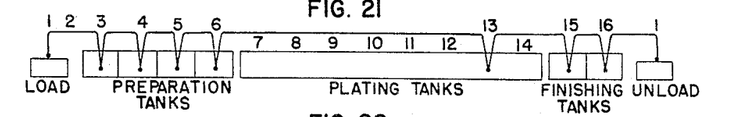
Figure 22:
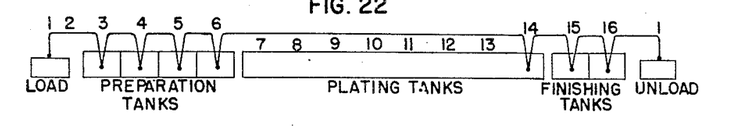

In Figure 15 there is illustrated the operative work cycle for a work member that is deposited in the first plating station, and Figures 16 through 22 show the work cycles for the work members that are delivered to the others of the stations of the plating tank. Each work member delivered to a station of the plating tank, as, for example, the one that is delivered to the first station of the plating tank as in Figure 15, dwells therein during the carrying out of the several other subcycles indicated before it is removed from the plating tank and passed through the finishing stations.

It will be apparent, therefore, that the workpieces move in succession through the preparation and finishing tanks, but skip over each other in going to and from the plating tank.

Figures 1, 2:
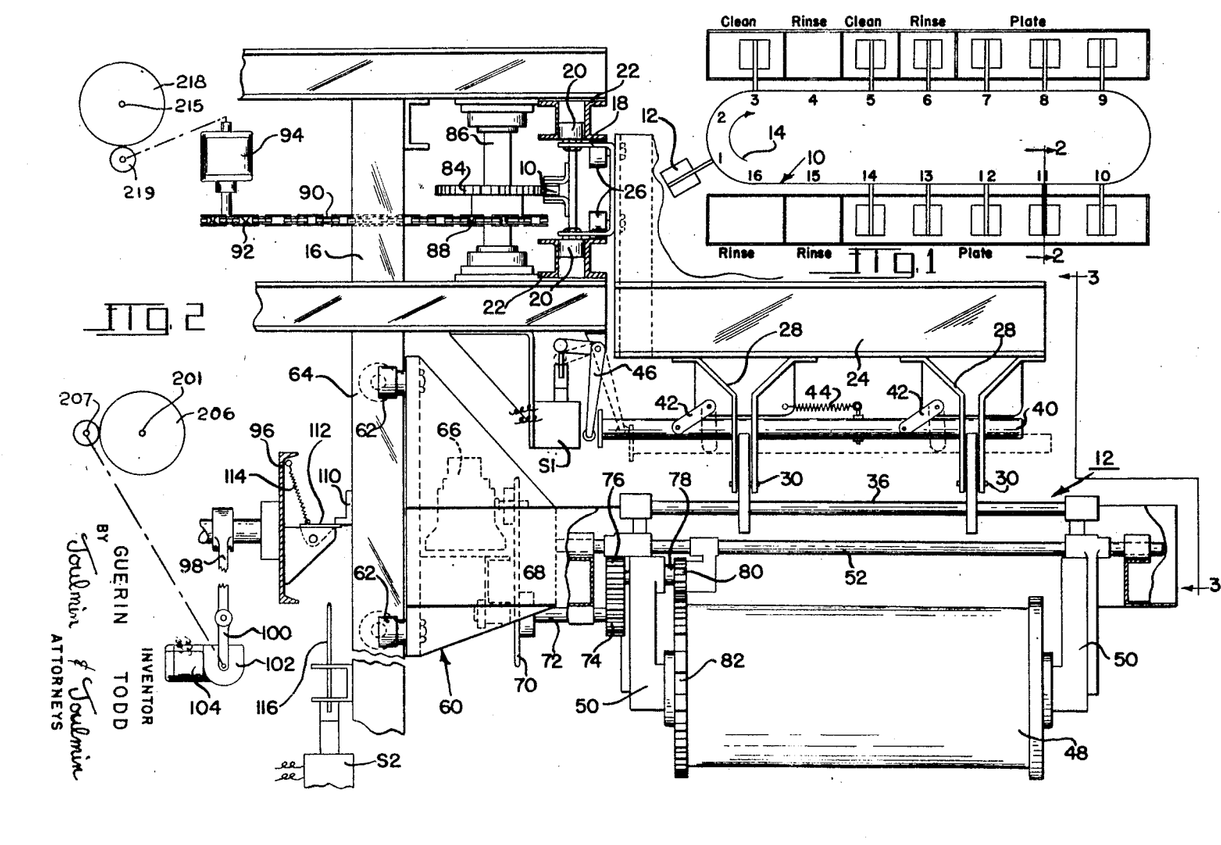
Figure 1 is a diagrammatic plan view of a processing machine adapted for being controlled by the control system of this invention.
Figure 2 is a vertical section taken through a typical work station of the machine and is indicated by line 2—2 of Figure 1.

The processing machine shown diagrammatically in Fig. 1 is adapted to be operated as above described under the control of the system of the invention and the machine has a frame, about which there extends a conveyor generally indicated at 10. This conveyor has attached thereto, at spaced intervals, carriers adapted for supporting workpieces or workpiece supporting elements 12. These elements are adapted for being moved by conveyor 10 about the frame of the machine in the direction of arrow 14. As the elements are so moved about the machine they successively align with a plurality of treatment stations. These station may provide any sort of treatments and the machine may be adapted for carrying out an electroplating cycle as indicated in Figure 1.

The stations about the machine are numbered from 1 through 16, and of these, station 1 is a loading and unloading station, station 2 is an idle station, stations 3 through 6 are the pre-plating treatment stations, stations 7 through 14 are the plating stations, and stations 15 and 16 are the post-plating rinsing treatments.

In Figure 1 it will be noted that there are eight of the elements 12 in the plating tanks. The purpose of the control system of this invention is to cause the machine to go through a plurality of operative cycles which are identical except that on each cycle a different one of the elements 12 is removed from the plating tanks and conveyed to station 15, while the element 12 at station 6 is then conveyed to the vacant plating station. Thus, each station of the plating tanks is vacated in succession and eight complete operative cycles of the machine must be carried out before an overall cycle is completed during which every one of the elements 12 has been conveyed out of the plating tanks.

Figures 3, 4, 5:
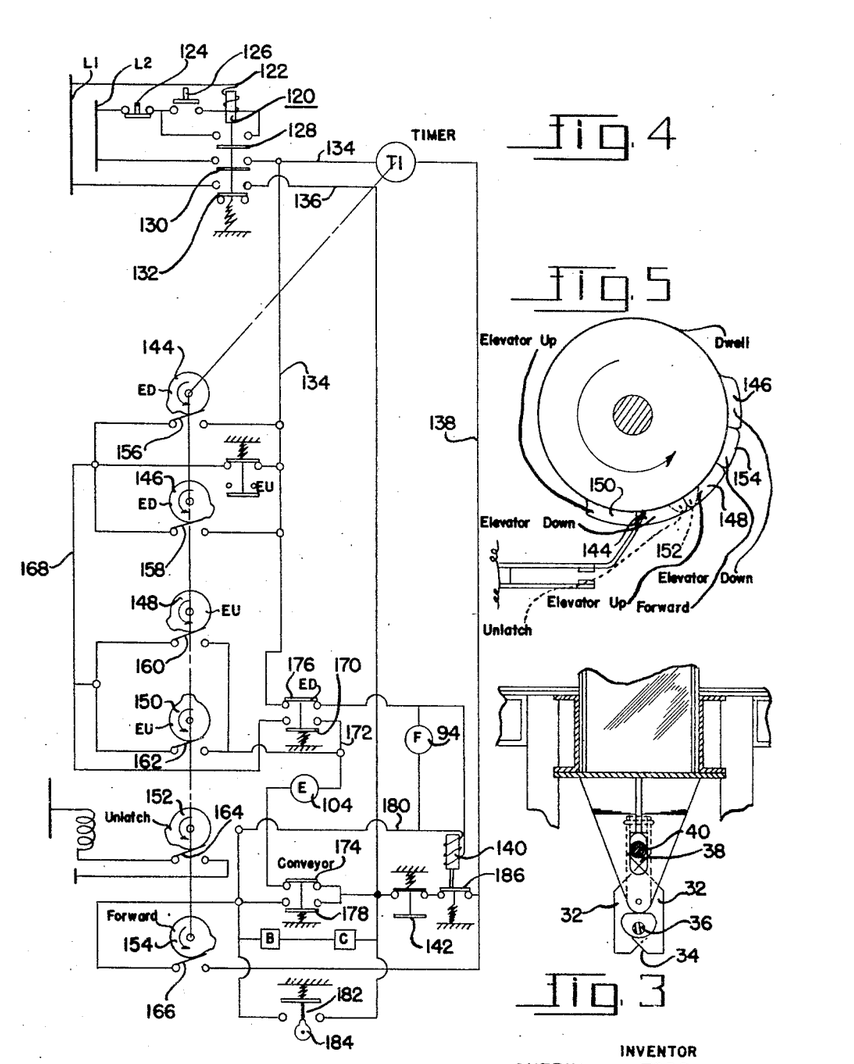
Figure 3 is a view on line 3—3 of Figure 2 showing the appearance of the carrier device of Figure 2 from the end thereof.
Figure 4 is a diagrammatic layout of a portion of the control system.
Figure 5 is a view showing the relationship of the several cams that control switches of the Figure 4 diagram.

Turning now to Figures 2 and 3, the frame of the machine is indicated at 16, and the conveyor 10 will be seen to be a chain to which is connected, at intervals, the brackets 18 having rollers 20 that are guided in channels 22 forming a part of frame 16 of the machine. Each bracket 18 is connected with a carrier device 24 extended outwardly from the frame of the machine over the work stations. Support is provided for the carrier devices by the rollers 20 in channels 22 and by the rollers 26 which engage the faces of the members forming channels 22.

Each carrier device has depending therefrom brackets 28 which have pivoted thereto, as by pivot pins 30, a pair of hook-like elements that form a latch for supporting the elements 12. Reference to Figure 3 will reveal that the hooks 32 have cam surfaces 34 at their lower ends by means of which the hooks can be cammed apart by the supporting bar 36 to bring about engagement of the bar between elements 32 whereby the workpiece supporting elements 12 can be latched to the carrier devices 24 to be conveyed thereby.

At their upper ends, hooks 32 likewise have cam surfaces 38 and an unlatching bar 40 is provided which can be moved downwardly between the cam surfaces 38 thereby opening the lower ends of hooks 32 and releasing the support bar 36 retained therebetween.

Bar 40 is suspended from the carrier device by links 42 and is normally urged toward its retracted position by a spring 44. At each work station about frame 16 where it is desired to accomplish unlatching of the elements 12 from the carrier devices there is a solenoid S-1 which when energized, will move bell crank 46 pivoted to the frame into the dotted line position shown in Figure 2 in which it pushes bar 40 rightwardly into its unlatching position.

The elements 12 may comprise, as seen in Figure 2, a barrel or perforated drum 48 which rotatably hangs between uprights 50 that at their upper ends are connected with support bar 36. There also extends between uprights 50 a pair of rods 52 which may comprise the means for supplying electrical energy to the contents of the barrel or drum 48 and which also comprise the means of supporting the barrel on a vertical slide which moves the workpiece supporting element between its latched position on the conveyor and its lower position wherein the workpieces in the barrel receive treatment.

The slide comprises a structure 60, including rollers 62 that engage both the inner and outer surfaces of the vertical channels 64 that provide guide means for the slide. There are as many slides about the frame of the machine as there are work stations, and these slides remain in position, merely reciprocating vertically for conveying the workpiece supporting elements to and from the conveyor of the machine and the work stations.

Inasmuch as it is desirable to rotate barrel 48, there may be a motor, such as geared head motor 66, carried by the slide which drives through chain 68 and sprocket 70 a shaft 72 having pinion 74 adapted to mesh with gear 76 on shaft 78 journaled in one of uprights 50. A flexible cable preferably supplies energy to motor 66 so the barrel can be rotated while the slide is elevated, or contact rails may be provided for this purpose.

Shaft 78 has a pinion 80 thereon that meshes with a gear 82 on one end of barrel 48 whereby motor 66 will cause barrel 48 to rotate so long as the workpiece supporting element is in position on the slide.

For bringing about movement of conveyor 10, the chain thereof is engaged by a sprocket 84 on shaft 86 journaled in the machine frame and also having a sprocket 88 over which chain 90 passes. Chain 90 also engages a sprocket 92 that is driven by a motor 94.

For bringing about vertical reciprocation of slides 60 there is an elevator structure 96 vertically slidable on the machine frame as by the pitmans 98 that are connected with the cranks 100 mounted on the output shafts of geared speed reducers 102 adapted for being driven by a motor 104.

The elevator extends the length of the frame of the machine and is adapted for having lifting means mounted thereon at each work station where lifting of the workpiece supporting elements takes place. Referring to Figure 1, there will be seen a lifting means at each of the numbered stations 1 and 3 through 16. Similarly, at each of the same stations there is one of the unlatching solenoids S-1.

The lifting means at each station where lifting of the workpiece supporting elements takes place comprises the brackets 110 mounted on the backs of the slides 60 and extending toward the elevator structure, and the lift plates 112 pivotally carried on the elevator. Each of the lift plates 112 is normally urged by a spring 114 toward position to engage the adjacent lift bracket 110. However, when the elevator is in its lowermost position, there is a plunger 116 which will engage plate 112 and tilt it into position to bypass the adjacent lift bracket so that when the elevator goes up it will not lift the slide at that station. A solenoid S-2 is provided for each plunger 116 and when energized the solenoid will pull the plunger downwardly whereupon the spring 114 of the associated lift plate 112 will move the plate into its operative position. It will be seen that by controlling the energization of the solenoid S-2, the lifting of the slides 60 and the workpiece supporting elements associated therewith can be selectively controlled.

Control system

Figure 6:
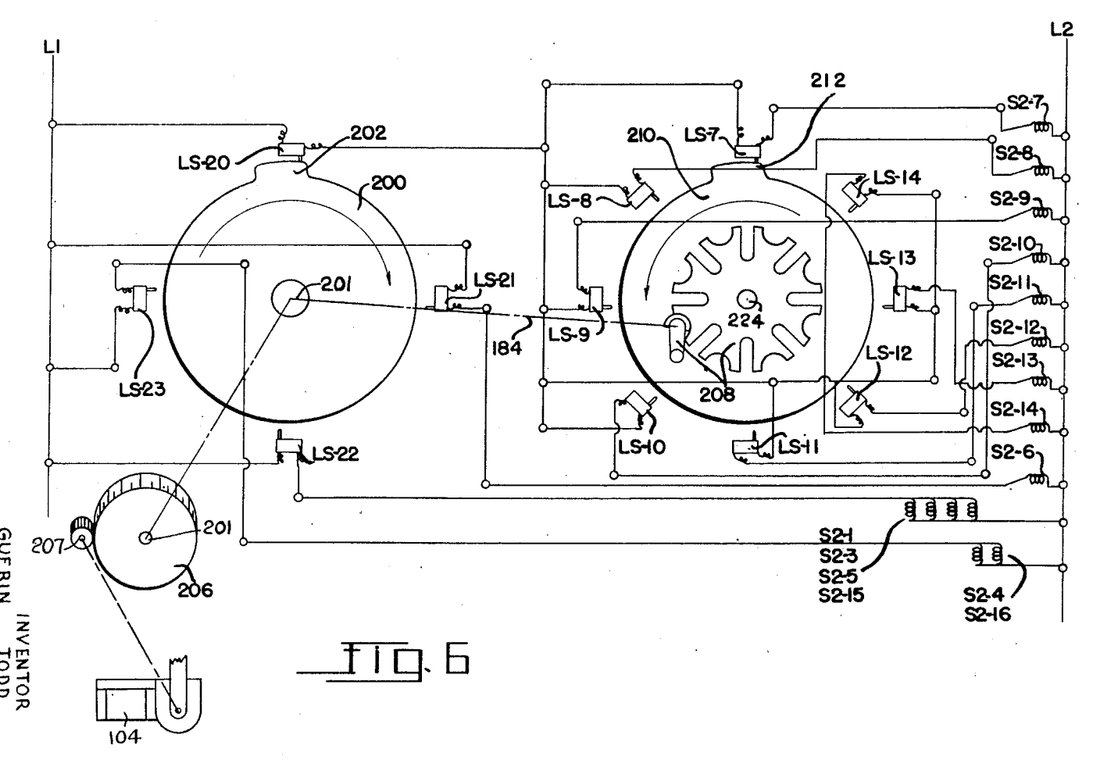
Figure 6 is a diagrammatic view showing another portion of the control system.
Figure 7:
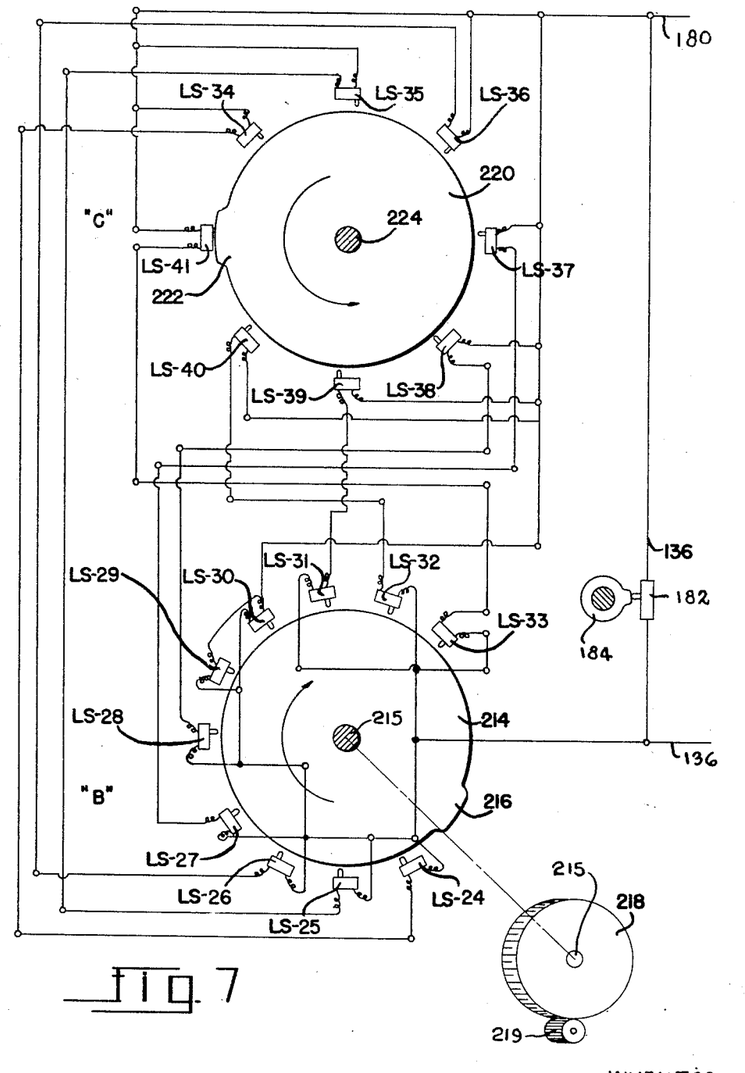
Figure 7 is a view similar to Figure 6 but showing still another portion of the control system.

Figures 4 and 5 illustrate the control system by means of which the operation of the conveyor and the elevator and the energization of the unlatching solenoids S-1 is interlocked during an operative cycle of the machine. The portion of the control system illustrated in Figures 6 and 7 illustrates the arrangement for selecting the one of the workpiece supporting elements that is to be lifted from the plating tank and the manner of controlling the amount of movement taken by the conveyor.

In Figure 4 the conveyor motor 94 is marked F and the elevator motor 104 is marked E. These motors are arranged in a circuit having the supply lines L-1 and L-2. A contactor 120 having a coil 122 is connected between the lines in series with normally closed stop switch 124 and normally open start switch 126. The contactor controls a first blade 128 that bypasses start switch 126 thereby to provide a holding circuit for the coil, and the blades 130 and 132 which connect the power lines L-2 and L-1 with the wires 134 and 136 respectively when the contactor is energized.

In line 134 is a timer T-1, the circuit for which is normally completed from wire 134 through the timer, through wire 138, the blade of a solenoid operated switch 140, and a switch 152 to wire 136.

The timer T-1 has a shaft on which are mounted the cams 144, 146, 148, 150, 152 and 154. These cams control switches 156, 158, 160, 162, 164 and 166 respectively. The switches 156 and 158 are connected in parallel between wire 134 and a wire 168 leading to one terminal of a switch ED having a blade 170 adapted for connecting the terminal with another terminal connected by wire 172 with one side of the elevator drive motor 104. The other side of the elevator drive motor is connected through blade 174 of a switch marked "conveyor" with wire 136.

Also connected in parallel with switches 156 and 158 is a switch EU that is normally closed but which is adapted for being opened by the elevator at the top of its stroke. Blade 170 of switch ED similarly is normally closed but is adapted for being opened by the elevator when it reaches the bottom of its stroke. Switch 164 is connected in series with the parallel unlatching solenoids S-1 so that closing of the switch by its cam will energize all of the unlatching solenoids simultaneously. Switch 166 is connected in circuit with the conveyor drive motor 94 and brings about energization thereof when the elevator is in its lowered position.

The control circuit also includes a switch marked "conveyor" which, in addition to the blade 174, also includes a blade 178 that is normally closed but which is adapted for being opened each time the conveyor aligns the carrier devices thereon with the work stations of the machine. Blade 174 is connected in circuit with the elevator drive motor 104 so that the elevator will only operate when the conveyor is halted with its carrier devices in proper alignment with the work stations of the machine.

Considering first the operation of the elevator motor 104, if the elevator is in its lowermost position and the conveyor is halted in proper position, then there is a circuit established to the elevator motor 104 from power line L-1 through blade 132, wire 136 and blade 174 of the conveyor switch. From the other side of the line L-2 there is a circuit through blade 130 of the contactor, wire 134, the closed blade of switch EU and wire 168 to the terminals of switches 160 and 162 and one of the terminals of blade 170 of switch ED, the other terminal of which is connected with motor 104 and also with the other terminals of switches 160 and 162. Closing of either of switches 160 or 162 will complete the circuit from wire 168 to motor 104 and thus set the elevator into motion.

As soon as the elevator starts upwardly, blade 170 of switch ED closes and thereby holds elevator motor 104 energized until the elevator reaches the top of its stroke, at which time it engages and opens switch EU, thereby again interrupting the energizing circuit.

Subsequently, when it is desired to lower the elevator, the now opened switch EU may be bypassed by closing of either of switches 156 and 158. Similarly, as when the elevator came up, switch EU will close when the elevator starts down and hold the elevator motor energized until the elevator engages and actuates switch ED. It will be evident that the several cams 144 through 150 need only close their associated switches for a brief period sufficiently long for the elevator to move off the one of switches EU or ED with which it is at that time engaged. It will also be evident that at any time the conveyor motor is operating, blade 174 of the conveyor switch will be held open and prevent energization of the elevator motor.

Turning now to the conveyor motor 94, one side of this motor is connected through blade 176 of switch ED with wire 134, while the other side is connected through a wire 180 with one side of a normally closed switch 182, the other side of which is connected with wire 136. Switch 182 is adapted for being opened by a cam 184 that is mounted for rotation with one of the shafts associated with the conveyor driving mechanism. The purpose of the switch is to allow for precise positioning of the conveyor when it comes to a halt.

Connected in parallel with switch 182 is a branch line including the elements B and C. Elements B and C are the switch arrangements illustrated in Figure 6, which will be described subsequently and which provide for operation of the conveyor the proper distance to convey whichever one of the workpiece supporting elements is elevated from the plating tank to station 15 which is the first post-plating treatment station.

Elements B and C also provide for the proper amount of movement of the conveyor to thereafter convey the workpiece supporting elements from station 6, which is the last pre-plating treatment station, to the vacated station in the plating tank, the elements thus skipping over or bypassing the occupied plating stations. It will be evident that the branch including elements B and C and the branch including switch 182 bypass the conveyor switch so that both of the branches and the conveyor switch must present an open circuit between wires 134 and 136 to de-energize conveyor motor 94. It will also be evident that motor 94 can only be energized when switch ED is engaged by the elevator so as to close blade 176 thereof.

Conveyor motor 94 is energized by closing the switch 166 by cam 154 which establishes a circuit through the motor of timer T–1 and the switch 182 to wire 180. As soon as the conveyor starts to move, the conveyor switch blade 178, the branch line containing elements B and C, and switch 182 will maintain the conveyor motor energized for the proper length of time.

Inasmuch as the length of time which the conveyor runs will vary considerably, no fixed period can be assigned to this portion of the cycle as can be done with the elevator up and down movements. For this reason, it is preferable to de-energize the motor of timer T–1 after the conveyor commences movement and to again energize the motor of the timer when the conveyor comes to a halt. This is accomplished by connecting in parallel with motor 94 the solenoid 140 which will open its blade 186 when energized thereby interrupting the energizing circuit for the timer motor. During the brief period that the conveyor motor is coming up to speed and setting the conveyor into motion, the timer motor may remain energized through the switch 166 but upon opening of the switch will immediately become de-energized until motor 94 is de-energized and permits blade 186 to close.

The exact relationship of the several cams 144 through 154 is illustrated in Fig. 5 where it will be noted that cam 146 is first effective in causing the elevator to move down, and then cam 154 is effective to bring about movement of the conveyor. When the conveyor is halted and the motor of the timer is again reenergized, as explained above, cam 148 becomes effective for moving the elevator up. After the elevator has reached the top of its stroke and before cam 144 becomes effective for causing the elevator to move down, cam 152 becomes effective for energizing the unlatching solenoids S–1, thereby to release the workpiece supporting elements that are connected with the carrier devices so that they can be lowered when the elevator moves downwardly.

Following the operation of cam 144, cam 150 operates to cause the elevator to move upwardly with selected ones of the workpiece supporting elements. It will now be noted that there is a considerable dwell period between the time cam 150 causes up movement of the elevator and cam 146 causes down movement thereof. This is due to the fact that the workpiece supporting elements that were lifted by the elevator when cam 150 became effective are preferably drained of all liquids directly over the work stations in which they were treated. For this reason the entire system dwells stationary for the length of time that it takes the timer motor to bring cam 146 into effective position.

As an example of the distribution of time during a cycle, 4 seconds may be allowed for each elevator up and each elevator down movement, while 28 seconds is allowed for the dwell period, the conveying time, as mentioned previously, being variable in accordance with the amount of movement required by the conveyor.

Turning now to Fig. 6, this view illustrates the arrangement employed for selecting the one of the workpiece supporting elements which is to be removed from the plating tanks. The solenoids S–2 associated with the several plungers 116 for controlling the lift out plates 112 about the plating tanks are represented at the right side of the view and are identified by the reference numerals S2–7 through S2–14, the final number indicating the particular station about the plating tanks with which the solenoid is associated. Fig. 6 also includes the solenoids S2–6, the parallel connected solenoids S2–1, S2–3, S2–5 and S2–15, and the parallel connected solenoids S2–4, S2–16.

Each of the solenoids S2–7 through S2–14 is connected in series with one of a group of normally open limit switches identified as LS–7 through LS–14, the number indicating the one of the solenoids to which the switch is connected. These limit switches have one of their terminals connected together and joined with one terminal of a normally open limit switch LS–20, the other side of which is connected with line L1.

Solenoid S2–6 is also connected with line L1 through normally open limit switch LS-21, the parallel connected solenoids S2–1, S2–3, S2–5 and S2–15 are similarly connected with line L1 through normally open limit switch LS–22, while solenoids S2–4 and S2–16 are connected with line L1 through normally open limit switch LS–23.

A cam plate 200 having lobe 202 is mounted on a shaft 201 that is driven by gears 206 so as to make one-fourth of a revolution for each two complete round trips of the elevator. Since one rotation of the shaft of timer T–1 will give two complete round trips of the elevator, it will be evident that cam 200 will turn 90° for each complete rotation of the timer shaft 184.

Cam plate 200 is connected through an 8–1 Geneva mechanism 208 with a second cam plate 210 having a lobe 212. Each complete revolution of cam plate 200 will thus give one-eighth of a revolution of cam plate 210.

With the cam plates 200 and 210 as illustrated, switches LS–20 and LS–7 are closed, thereby energizing S2–7. The upward movement of the elevator will therefore lift the workpiece supporting element from station 7 of the plating tanks. In a like manner, the other workpiece supporting elements in the plating tanks are successively lifted therefrom when the cam plates 200 and 210 move into proper register.

Turning now to Fig. 7, there are illustrated the elements B and C previously referred to and forming a bypass across switches 182 and blade 178 of the conveyor switch. Element B comprises the limit switches LS–24 through LS–33 which are arranged about a periphery of a cam plate 214 having lobe 216. The said limit switches occupy ten of thirteen equally spaced positions about the cam and the cam is connected by gears 218 with the conveyor drive, so that each time the conveyor moves the distance between two successive work stations, the cam plate will move one-thirteenth of a revolution. The limit switches LS–24 through LS–33 are all normally open and are adapted for being closed when engaged by lobe 216 of cam plate 214.

The limit switches have one of their terminals connected together and to wire 180 and the other terminals of switches LS–24 through LS–28 are respectively connected with one of the terminals of the limit switches LS–34 through LS–38 which are arranged about the periphery of cam plate 220 having lobe 222 and mounted on the same shaft 224 that supports cam plate 210 referred to in connection with Figure 6.

The limit switches LS–29 and LS–30 have their other terminals connected together and to wire 136, thereby bypassing element C. The other limit switches LS–31, LS–32 and LS–33 of element B have their other terminals connected with limit switches LS–38, LS–39 and LS–40 of element C. All of the other terminals of the limit switches of element C are connected together and to wire 136. The limit switches LS–34 through LS–41 are all normally closed and are adapted for being opened by lobe 222.

It will be evident at this point that each operative position of cam plate 220 will position its lobe 222 so as to open one of limit switches LS–34 through LS–41. Accordingly, when energization of the conveyor drive motor 94 takes place, the branch containing elements B and C will present a closed circuit between wires 136 and 180 each time blade 178 of the conveyor switch opens until lobe 216 engages and closes the limit switch that is in series with the one of the switches that is held open by lobe 222 of cam plate 220.

Operation

In order to demonstrate the manner in which the control system above operates to control the processing machine, a complete operative cycle will now be explained. Let it be considered that there is a workpiece supporting element in each of the stations of the plating tanks, and workpiece supporting elements in each of stations 1, 3, 5 and 6. The other stations 15, 16, 2 and 4 are at this time vacant. The cycle commences with cam plates 200 and 210 in the position illustrated in Fig. 6 and with the cam plates 214 and 220 in the position indicated in Fig. 7.

It may be assumed that the control system of Fig. 4 is energized and that the cams 144 through 154 are in the position indicated in Fig. 5. Under these circumstances, cam 150 closes switch 162 and brings about upward movement of the elevator which, due to the fact that solenoid S2–7 is energized, will lift the workpiece supporting element from station 7 of the plating tanks. When the elevator gets to the top of its movement, it will halt and the entire system will dwell for the period determined by the timer T–1 and thereafter the elevator will move down by the action of cam 146. The lifted workpiece supporting element will, of course, automatically latch to the carrier device on the conveyor and will remain up when the elevator comes down.

Cam 154 now operates to energize the conveyor motor 94. With the cam plates 214 and 220 positioned as illustrated in Fig. 7, the conveyor motor will remain energized until lobe 216 of cam plate 214 strikes the one of the limit switches associated therewith that is in series with limit switch LS–41 that is held open by lobe 222 of cam plate 220. It will be evident that this is limit switch LS–33 and that the conveyor will move ten spaces, bringing cam lobe 216 into position to engage switch LS–33. Reference to Fig. 1 will reveal that this ten spaces of movement will convey the workpiece supporting element into alignment with station 15, which is the first post-plating treatment station.

Inasmuch as limit switch LS–41 is open, the branch containing elements B and C is now open, and when the conveyor has its carrier devices approximately aligned with the treatment stations of the machine, the conveyor switch blade 178 will open, thereby opening that branch, and then when the conveyor drive has reached a predetermined point thus precisely positioning the conveyor, cam 184 will open switch 182, thus de-energizing the conveyor motor and halting the conveyor.

As explained before, during energization of the conveyor motor, timer T–1 was de-energized, but is now again automatically energized and moves cam 148 into position to cause upward movement of the elevator. This upward movement of the elevator is not accompanied by the lifting of any of the work piece supporting means, but when the elevator gets to the top of its stroke, cam 152 energizes the unlatching solenoids and releases the workpiece supporting element that the conveyor is holding over work station 15. Cam 144 now becomes effective to cause the elevator to move downwardly, carrying with it the released workpiece supporting element so as to deposit it in treatment station 15.

The elevator has now made two complete round trips and this has brought cam lobe 202 into position to close switch LS–21 that is in series with solenoid S2–6. Accordingly, when cam 150 now again becomes effective to cause upward movement of the elevator, the elevator will pick up the workpiece supporting element in station 6. The dwell period described previously then obtains and following that the elevator moves down due to cam 146. Cam 154 now again makes the conveyor drive motor 94 effective for moving the conveyor chain. Movement of the conveyor now commences but will continue for only one space because cam lobe 216 will move off limit switch LS–33, thus leaving the branch containing elements B and C open and permitting switch 182 and conveyor switch blade 178 to control the halting of the conveyor motor. Thereafter, cams 148, 152 and 144 will be successively effective in causing the elevator to move up, to receive the workpiece supporting element which was lifted from station 6 and which is now in alignment with station 7, and to set the workpiece supporting element down in station 7.

The elevator has now completed two more round trips and cam lobe 202 has been moved into position to engage limit switch LS–22 which is in series with the parallel connected solenoids S2–1, S2–3, S2–5 and S2–15. When the elevator again comes up because of the action of cam 150, it will therefore lift the workpiece supporting elements of stations 1, 3, 5 and 15. The dwell period previously described now occurs and thereafter cam 146 causes the elevator to move down, leaving latched to the carrier device the four workpiece supporting elements that were lifted.

The conveyor motor is now again energized by the action of cam 154 and drives the conveyor chain one more step forward, this single step movement occurring because cam lobe 216 is still not positioned to engage any of its associated limit switches and therefore the branch containing elements B and C is still open.

The four workpiece supporting elements which are now supported on the conveyor have thus been conveyed to stations 16, 2, 4 and 6. The elevator now comes up due to the action of cam 148, and the unlatching cam 152 releases the workpiece supporting elements at stations 16, 4 and 6 to the elevator so that when the elevator comes down, due to the action of cam 144, these workpiece supporting elements also move down. The workpiece supporting element in station 2 is not released and remains suspended from the conveyor.

The elevator has now completed two more round trips and cam lobe 202 now engages limit switch LS–23 that is in series with solenoids S2–4 and S2–16. When the elevator then comes up, due to the action of cam 150, it elevates the workpiece supporting elements in stations 4 and 16 and latches them to the conveyor. After the dwell period, the elevator again moves down, due to the action of cam 146, and then cam 154 causes the conveyor motor to be energized. The conveyor motor again runs and causes a single space of movement of the conveyor chain, due to the fact that cam lobe 216 is still not in position to strike any of its limit switches and the branch containing B and C is still open.

After the conveyor halts, the elevator again goes up, due to cam 148, and by the action of cam 152, the workpiece supporting elements, which are now in stations 1, 3 and 5, are released and move down with the elevator when cam 144 becomes effective. The elevator again has made two complete round trips and this has brought cam plate 200 into position to return its cam lobe 202 into engagement with switch LS-20 and has also made the Geneva mechanism 256 effective for turning cam plate 210 one-eighth of a revolution counter-clockwise.

The same work stations that were identified at the beginning as having workpiece supporting elements therein and all parts of the control system and machine are in their initial position with the exception of cam plate 210 which is now positioned so that its cam lobe 212 engages switch LS-8 and cam plate 220 which is now positioned so that its lobe 222 engages switch LS-40.

With the cam plates positioned as described, the next following cycle of operation of the machine is identical with the one described except that the workpiece supporting element in station 8 of the plating tanks is lifted and is conveyed to station 15, the conveyor moving one less space than on the last cycle due to the fact that it will halt when the cam lobe 216 engages limit switch LS-32 which is in series with limit switch LS-40 which is held open by cam lobe 222. Also, when the elevator thereafter picks up the workpiece supporting element from station 6 to carry it into plating position, the conveyor will move two spaces, due to the fact that at the end of one space of movement, cam lobe 216 will close limit switch LS-33 and thus maintain the conveyor motor energized for movement through one more space. In all other respects the cycle of operation is the same.

From the foregoing it will be apparent that the machine will cycle continuously and that each cycle will be the same as the preceding cycle except that a different workpiece supporting element is taken from the plating tanks on each cycle and the amount of movement of the conveyor is regulated to convey the said workpiece supporting means the proper distance, and to convey the workpiece supporting means from the last pre-plating station to the vacant plating station.

Figures 8, 9, 10:
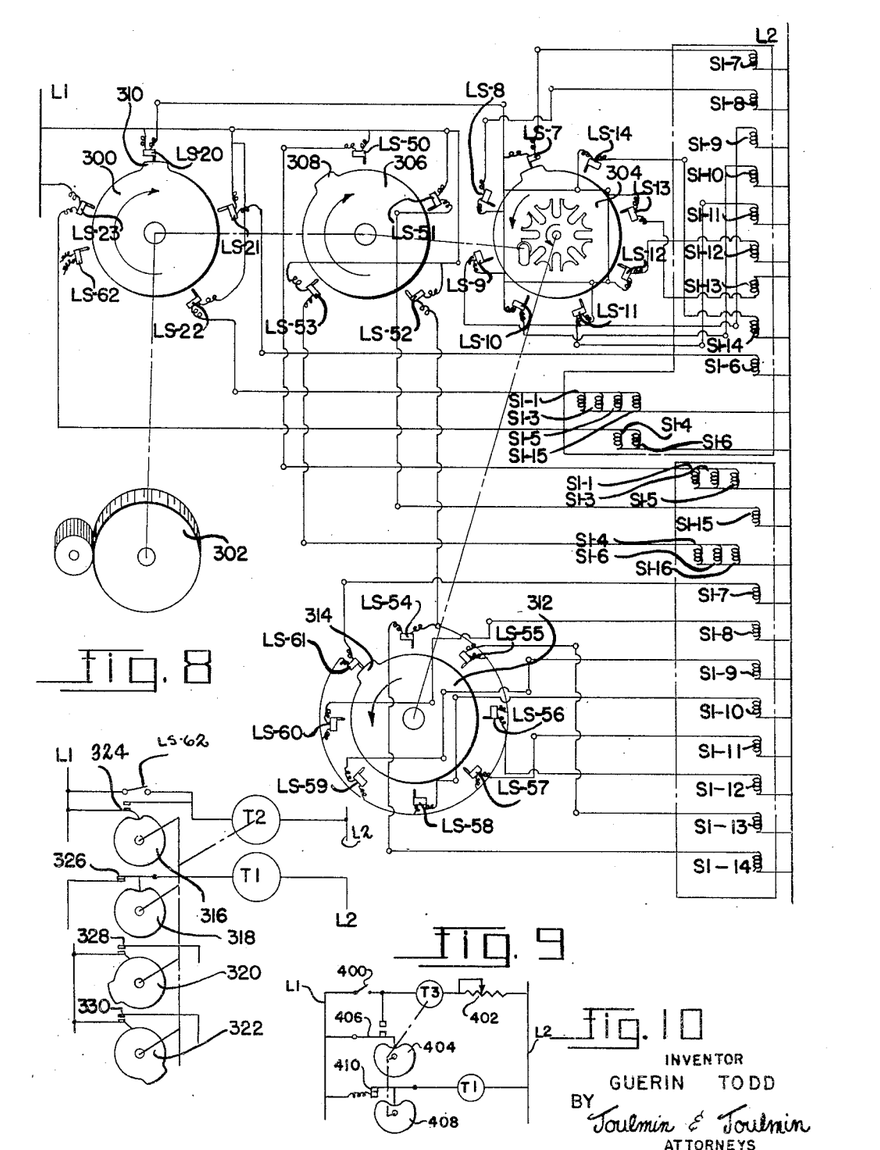
Figure 8 is a view of a modified control system embodying the elements of both Figure 6 and Figure 7.
Figure 9 is a fragmentary view showing an arrangement for modifying the circuit of Figure 4 when the modified arrangement of Figure 8 is employed.
Figure 10 is a diagrammatic view showing how a variable timer can be included in the control system for varying the overall cycle timer.

*Modified control circuit of Figures 8 and 9*

In Figs. 8 and 9 there is shown a modified control circuit by means of which somewhat more rapid and efficient operation of the machine obtains. In the modification of the control system described above the latching of the workpiece supporting elements to the conveyor and the unlatching of the workpiece supporting elements therefrom took place during different round trips of the elevator. This occasions some waste movement of the elevator and some lost time, considering the overall cycle.

In the modification of Figs. 8 and 9 each round trip of the elevator is accompanied by both latching of workpiece supporting elements to the conveyor and unlatching other workpiece supporting elements therefrom, so, as compared to the first modification, the control of the present modification permits the elevator to complete two operations on each round trip.

This is accomplished by separating the unlatching solenoids S1 and individually energizing them as was done in connection with the solenoids S2 associated with the lift plates 112.

When the control system of Figs. 8 and 9 is employed, the cycle of the machine is as follows:

Assuming the machine to be at that point in the cycle when one of the workpiece supporting elements is to be lifted from the plating tank, then the upward movement of the elevator for lifting that workpiece supporting element will raise the said element to the conveyor and latch it thereto and at the same time workpiece supporting elements at stations 1, 3 and 5 will be released from the conveyor and lowered into those stations when the elevator moves downward. The conveyor then runs and carries the workpiece supporting element that was lifted from the plating tank to station 15. Then, when the elevator comes up, it will lift the workpiece supporting element from station 6 and latch it to the conveyor and at the same time receive from the conveyor the workpiece supporting element at station 15 and lower it into said station.

The conveyor then again runs until the workpiece supporting element that was lifted from station 6 is aligned with the now vacant plating station. The elevator then comes up, lifting the workpiece supporting elements at stations 1, 3, 5 and 15 and latching them to the conveyor, and receives from the conveyor the workpiece supporting element over the vacant plating station and lowers it therein. The conveyor then moves a single step and the elevator comes up without lifting any workpiece supporting element and receives from the conveyor the workpiece supporting elements at stations 4, 6 and 16.

At this time the auxiliary control means of Fig. 9 comes into operation and prevents the conveyor from running and, instead, causes the elevator to make another round trip during which time the workpiece supporting elements are lifted from stations 4 and 16 and latched to the conveyor and the elevator returns to its lowered position without lowering any of the workpiece supporting elements. The workpiece supporting elements are now attached to the conveyor at stations 2, 4 and 16.

The conveyor now operates again and moves one step and this brings the workpiece supporting elements carried thereby into alignment with stations 1, 3 and 5 which returns the machine to its original condition.

It will be seen from the foregoing that the elevator makes five round trips for each complete cycle of the machine. Accordingly, cam 300 of Fig. 8, which corresponds to cam 200 of Fig. 6, is connected with the elevator drive through 5 to 1 reduction gearing 302.

Cam 304 of Fig. 8 is identical with cam 210 of Fig. 6 and is similarly connected through an 8–1 Geneva drive with the shaft of cam 300. The limit switches associated with cam 304 and the shifter solenoids which are connected therewith have the same numbers as they bear in Fig. 6 and so far as the operation of the circuit of Fig. 8 is concerned, these similarly numbered parts operate in the same manner as those of Fig. 6.

The limit switches associated with cam 300 are also numbered the same as those associated with cam 200 of Fig. 6 and operate in the same manner except that they are positioned differently about the said cam, the four switches occupying four consecutive of five evenly spaced positions about the cam as indicated in Fig. 8.

In Fig. 8 an additional cam 306 is employed which is mounted on the same shaft as cam 300 and which controls limit switches numbered LS–50, LS–51, LS–52 and LS–53 and occupying four consecutive of five evenly spaced positions about the cam. The lobe 308 of cam 306 is one-half space backwardly from lobe 310 of cam 300, the arrangement being such that when the elevator is down cam 310 is in alignment with one of the five switch positions thereabout and when the elevator is up lobe 308 is in line with one of the switch positions thereabout.

Still another cam 312 is mounted on the shaft with cam 304 and includes a lobe 314 that controls eight limit switches numbered from LS–54 through LS—61. These limit switches are connected with the various unlatching solenoids which are marked S1–1, and S1–3 through S1–16, the final number indicating the station at which the unlatching solenoid is located. The purpose of cam 312 is to select the one of the latching solenoids which is to operate when a workpiece supporting element is to be lowered into a plating tank. For this reason it is connected with cam 304 and rotates therewith so that whichever plating station has been selected by cam 304 will also be selected by cam 312.

As mentioned previously, at one point in the cycle the conveyor movement is prevented and two round trips occur between successive conveyor movement. This is obtained by an auxiliary limit switch LS-62 which is associated with cam 300 so as to be closed thereby when the elevator comes up to receive the workpiece supporting elements 4, 6 and 16 from the conveyor as determined by engagement of switch LS-53 by lobe 308 of cam 306. As the elevator reaches the top of its movement, switch LS-62 will be closed and this will establish a circuit through timer motor T-2. Timer motor T-2 commences to run, driving cams 316, 318, 320 and 322. Cam 316 controls a switch 324 that holds timer T-2 energized and cam 318 controls a switch 326 that interrupts the energizing circuit for timer T-1. Timer T-1 corresponds to timer T-1 of Fig. 4 and switch 326 is connected in series therewith as indicated in Fig. 9.

Cam 320 controls a switch 328 that is in parallel with switches 156 and 158 of Fig. 4 so that closing of switch 328 will cause downward movement of the elevator. Cam 322 controls switch 330 that is in parallel with switches 160 and 162 of Fig. 4 so that closing of switch 330 will cause upward movement of the elevator. After one complete revolution of the cam shaft of timer T-2, switch 324 drops open to de-energize timer T-2 and switch 326 closes to again energize timer T-1. At this time the machine is returned to the control of the circuit of Figure 4 and after a predetermined dwell, the elevator will again go down and the conveyor will operate one step in order to return the machine to its original condition. At this time all of the cams of Figure 8 and Figure 4 are again in their initial position, except that cams 304 and 312 are each advanced one space counter-clockwise.

Inasmuch as there is only one work-piece supporting element to be lowered into the plating stations at any one time, all of the unlatching solenoids S1-7 through S1-14 could be operated at one time and thereby eliminate the cam arrangement at 312 and the associated limit switches LS-54 through LS-61.

However, in certain instances, selective unlatching over the plating stations might be desired and for this reason the circuit of Figure 8 has been arranged to accomplish this.

In Figure 10 it is illustrated how an additional timer T-3 can be employed in the control circuit for varying the overall cycle time of the machine. This is sometimes necessary when the treatment time, as for example, in the plating stations, exceeds the length of time required for the machine to carry out a complete cycle. By the arrangement of Figure 10, the overall cycle time can be adjusted at will and the correct amount of treatment given the workpieces.

Timer T-3 in Figure 10 is in series with a switch 400 that is adapted for being momentarily closed by the conveyor or some other moving part of the machine, once for each cycle of energization of the conveyor. Switch 400 is in series with timer T-3 which may be variable, as by the rheostat 402. Timer T-3 controls a cam 404 which closes holding switch 406 so that after the timer is energized its shaft will make one complete revolution and then automatically halt. A second cam 408 on the timer shaft controls a switch 410 which is in series with timer T-1 of the control system, so that timer T-1 is de-energized during the period of energization of timer T-3.

It will be evident that by adjusting timer T-3 so as to control the interval between successive parts of the overall cycle of the machine, the said overall cycle can be adjusted so as to be any required length, and thereby predetermine the treatment time given the workpieces.

It will be understood that this invention is susceptible of modification to adapt it to varying circumstances, and it is, accordingly, desired to comprehend such modifications as fall within the scope of the appended claims within this invention.

I claim:

1. In a machine having a plurality of work stations and a plurality of members to be moved thereto for treatment, a intermittently operated work conveyor movable along a path comprising a plurality of stopped positions, an elevator for moving the members between the conveyor and the work stations and comprising normally ineffective pick-up means at each station, a motor for each of the conveyor and elevator and means for energizing the motors according to a predetermined schedule, electrical means energizable for making said pick-up means effective, normally open switches for said electrical means, and a cam driven with said elevator for successively engaging and closing said switches, a holding circuit for the conveyor motor comprising a first branch line adapted for being opened each time the conveyor reaches one of its stopped positions, other branch lines in parallel with said first branch line including serially arranged normally opened and normally closed switches, a cam driven with the conveyor to close the normally opened switches in succession as the conveyor moves into its stopped positions, and a cam connected with the cam driven with the elevator for engaging and opening said normally opened switches in succession whereby the movement of the conveyor is varied in accordance with the ones of said pick-up means which have been made effective.

2. In a processing machine having a work station with a plurality of individual positions, a intermittently operated work conveyor movable along the station and having a stopped position at each of the positions of the station, an elevator for moving work members between the conveyor and work station at said positions, normally ineffective pick-up means on the elevator at each position, electrical means for each pick-up means energizable to make the associated pick-up means effective, a switch for each electrical means, and a cam for closing said switches in succession and connected with the elevator for being indexed from position to position thereby, separate motors for the elevator and the conveyor, respectively, and an energizing circuit for the conveyor motor comprising a first line adapted to be opened each time the conveyor reaches a stopped position, and a plurality of other branch lines in parallel with the first line and containing serially arranged switches, a cam movable with the conveyor for actuating certain of said serially arranged switches as the conveyor moves through its stopped positions, and another cam connected with the cam indexed by the elevator for controlling the remaining serially arranged switches.

3. In a processing machine having a series of work stations including one station with a plurality of working positions, a plurality of members to be moved to successive stations for treatment, a conveyor above the stations for advancing the members along the series of stations, elevating means for moving the members between the conveyor and the stations, drive means for operating the conveyor and the elevating means, means for detachably connecting the members to the conveyor, and selectively operable means at the respective stations for causing the members to be raised by the elevating means, a control mechanism which includes cam means for controlling the operation of the drive means and connecting means and causing their actuation in a cycle, means driven in synchronism with the elevating means for actuating the selectively operable means in cycles, and means for determining the duration of each operation of the conveyor by said drive means, said determining means including a rotary cam driven in synchronism with the conveyor and a second rotary cam advanced stepwise, one step upon each completion of a selected number of round trips by the elevating means.

4. In a processing machine having a series of work stations including one station with a plurality of working positions, a plurality of members to be moved to successive stations for treatment, a conveyor above the stations for advancing the members along the series of stations, elevating means for moving the members between the conveyor and the stations, drive means for operating the conveyor and the elevating means, means for detachably connecting the members to the conveyor, and selectively operable means at the respective stations for causing the members to be raised by the elevating means, a control mechanism which includes cam means for controlling the operation of the drive means and connecting means and causing their actuation in a cycle, means for actuating the selectively operable means in cycles including a rotary cam driven in synchronism with the elevating means and a second cam operated by the first cam and advanced stepwise, one step upon each completion of a selected number of round trips by the elevating means, and means for determining the duration of each operation of the conveyor by said drive means, said determining means including a rotary cam driven in synchronism with the conveyor and a second rotary cam driven in timed relation with the elevating means.

5. In a processing machine having a series of work stations including one station with a plurality of working positions, a plurality of members to be moved to successive stations for treatment, a conveyor above the stations for advancing the members along the series of stations, elevating means for moving the members between the conveyor and the stations, drive means for operating the conveyor and the elevating means, means for detachably connecting the members to the conveyor, and selectively operable at the respective stations for causing the members to be raised by the elevating means, a control mechanism which includes cam means for controlling the operation of the drive means and connecting means and causing their actuation in a cycle, means driven in synchronism with the elevating means for actuating the selectively operable means in cycles, and means for determining the duration of each operation of the conveyor by said drive means, said determining means including a rotary cam driven in synchronism with the conveyor and a second cam advanced stepwise by the drive means for the elevating means, one step upon each completion of a selected number of round trips by the elevating means.

6. In a processing machine having a series of work stations including one station with a plurality of working positions, a plurality of members to be moved to successive stations for treatment, a conveyor above the stations for advancing the members along the series of stations, elevating means for moving the members between the conveyor and the stations, drive means for operating the conveyor and the elevating means, means for detachably connecting the members to the conveyor, and selectively operable means at the respective stations for causing the members to be raised by the elevating means, a control mechanism which includes cam means for controlling the operation of the drive means and connecting means and causing their actuation in a cycle, means for actuating the selectively operable means in cycles including a rotary cam driven in synchronism with the elevating means and a second cam advanced stepwise, one step upon each completion of a selected number of round trips by the elevating means, and means determining the duration of each operation of the conveyor by said drive means, said determining means including a rotary cam driven in synchronism with the conveyor and a second cam advanced stepwise, one step upon each completion of a selected number of round trips by the elevating means.

References Cited in the file of this patent

UNITED STATES PATENTS

| | | |
|---|---|---|
| 1,382,144 | Taylor | June 21, 1921 |
| 2,106,706 | Gordon | Feb. 1, 1938 |
| 2,172,386 | Huff | Sept. 12, 1939 |
| 2,175,788 | Todd | Oct. 10, 1939 |
| 2,194,912 | Regan | Mar. 26, 1940 |
| 2,209,915 | Gordon | July 30, 1940 |
| 2,299,618 | Finston | Oct. 20, 1942 |
| 2,348,112 | Da Costa | May 2, 1944 |
| 2,513,433 | Skow | July 4, 1950 |
| 2,542,189 | Gates et al. | Feb. 20, 1951 |
| 2,579,598 | Morrison | Dec. 25, 1951 |
| 2,671,861 | Bullard III | Mar. 9, 1954 |